(12) United States Patent
Zhang et al.

(10) Patent No.: US 12,042,720 B2
(45) Date of Patent: Jul. 23, 2024

(54) ELECTRONIC EQUIPMENT WITH VIBRATION FUNCTION

(71) Applicant: AAC Acousitc Technologies (Shanghai)Co., Ltd., Shanghai (CN)

(72) Inventors: Lijin Zhang, Shenzhen (CN); Bing Xie, Shenzhen (CN)

(73) Assignee: AAC ACOUSITC TECHNOLOGIES (SHANGHAI)CO., LTD., Shanghai (CN)

( * ) Notice: Subject to any disclaimer, the term of this patent is extended or adjusted under 35 U.S.C. 154(b) by 240 days.

(21) Appl. No.: 17/741,492

(22) Filed: May 11, 2022

(65) Prior Publication Data

US 2023/0201878 A1    Jun. 29, 2023

(30) Foreign Application Priority Data

Dec. 29, 2021   (CN) .......................... 202123383438.7

(51) Int. Cl.
| | |
|---|---|
| *A63F 13/24* | (2014.01) |
| *A63F 13/212* | (2014.01) |
| *A63F 13/285* | (2014.01) |
| *B06B 1/14* | (2006.01) |
| *B06B 1/16* | (2006.01) |

(52) U.S. Cl.
CPC ............ *A63F 13/24* (2014.09); *A63F 13/212* (2014.09); *A63F 13/285* (2014.09); *B06B 1/14* (2013.01); *B06B 1/162* (2013.01)

(58) Field of Classification Search
None
See application file for complete search history.

(56) References Cited

U.S. PATENT DOCUMENTS

| | | | | |
|---|---|---|---|---|
| 2017/0120297 | A1* | 5/2017 | Chun | ..................... H02K 33/16 |
| 2019/0305637 | A1* | 10/2019 | Suzuki | ..................... B06B 1/045 |
| 2019/0363623 | A1* | 11/2019 | Wauke | ................. H05K 1/0277 |
| 2023/0361662 | A1* | 11/2023 | Takahashi | .............. H02K 33/02 |

OTHER PUBLICATIONS

English translation for WO/2019/026905 (Year: 2019).*

* cited by examiner

*Primary Examiner* — Jason T Yen
(74) *Attorney, Agent, or Firm* — W&G Law Group

(57) ABSTRACT

The present invention discloses electronic equipment with a vibration function, including a carrier and a vibration module configured for providing a vibration sense; the vibration module includes a housing having a receiving space and provided with an opening in at least one end; a vibration unit received in the receiving space and directly providing a vibration sense to a user; and an elastic member; the elastic member elastically connects the vibration unit to the housing, so as to elastically suspend the vibration unit in the receiving space. According to the electronic equipment of the present invention, in both cases where a surface of the carrier is a flexible material and the carrier is relatively heavy, local vibration can be provided through the independent vibration unit, so as to directly feedback vibration actually generated by the vibration unit to the user, thus improving the experience of the user.

6 Claims, 7 Drawing Sheets

ELECTRONIC EQUIPMENT WITH VIBRATION FUNCTION

TECHNICAL FIELD

The present invention relates to the technical field of tactile feedback, in particular to electronic equipment with a vibration function.

BACKGROUND

At present, a tactile feedback technology has been widely used in various high-end mobile phones, and has achieved good user experience.

However, in application scenarios where a surface of a carrier such as virtual reality (VR) equipment and an automobile seat is a flexible material or the carrier is relatively heavy, this technology has not been well applied. On one hand, since a motor is directly attached to a surface of a carrier made of a flexible material, the vibration energy of the motor is easily absorbed by the flexible material, resulting in weak vibration energy. On the other hand, the finally applied carrier is relatively heavy, which causes that the carrier cannot be driven to vibrate together. In both aspects, the equipment cannot directly feedback the vibration actually generated by a vibration module to a user, which results in an extremely poor user experience.

Therefore, it is necessary to provide electronic equipment with a vibration function to solve the above problems.

SUMMARY

The embodiments of the present invention aim to provide electronic equipment which can directly feedback vibration actually generated by a vibration module to a user to enhance the user experience, and have a local vibration function.

In order to achieve the above objective, an embodiment of the present invention provides electronic equipment with a vibration function, including a carrier and a vibration module configured for providing a vibration sense; the vibration module includes a housing having a receiving space and provided with an opening in at least one end; a vibration unit received in the receiving space and directly providing a vibration sense to a user; and an elastic member. The housing is mounted on the carrier; and the elastic member elastically connects the vibration unit to the housing, so as to elastically suspend the vibration unit in the receiving space.

Much further, the vibration unit includes a vibration motor, and a vibration block wrapped on an outer periphery of the vibration motor; and the elastic member is connected to the vibration block for elastically connecting the vibration unit to the housing.

Much further, the elastic member is a clip or elastic silica gel.

Much further, an outer peripheral side of the housing protrudes to form at least two mounting holes that are spaced apart from each other.

Much further, two elastic members are included, which are arranged on two opposite sides of the vibration unit along a direction perpendicular to a vibration direction of the vibration unit.

Much further, each elastic member includes a first connection portion, one end of which is connected to the vibration block; two extension portions formed by outwardly extending from two opposite sides of one end of the first connection portion away from the vibration block; and second connection portions formed by extending, in a bent manner, from ends of the two extension portions away from the first connection portion towards a direction close to the housing; and the second connection portions and the housing are detachably connected.

Much further, sunken slots formed by inward sinking are formed in positions of the housing corresponding to the second connection portions; and the second connection portions extend into the sunken slots and are detachably connected with slot bottoms of the sunken slots.

Much further, the housing includes a base having a suspension slot, and a cylinder detachably connected with a periphery of the base; the cylinder is of a hollow structure provided with openings in two ends; the suspension slot and the hollow portion of the cylinder jointly form the receiving space; the vibration unit is received in the receiving space; the elastic member is arranged on one side of the vibration unit close to the base; the elastic member includes a supporting portion connected to the vibration unit, a ringlike portion which surrounds the supporting portion and is spaced apart from the supporting portion, and an elastic arm for connecting the supporting portion to the ringlike portion; and the ringlike portion is detachably connected to the base.

Much further, circumferential walls of two ends of the cylinder are provided, at intervals along the vibration direction of the vibration unit, with a plurality of guide slots that is spaced apart from one another; and limiting portions which extend into the guide slots are arranged at positions of the vibration unit corresponding to the guide slots.

Much further, the carrier is provided with a mounting slot formed by inwardly sinking from one side of the carrier; the housing is mounted in the mounting slot; and one side of the vibration module away from the mounting slot and the side of the carrier provided with the mounting slot are located on the same horizontal plane.

Compared with the related art, the electronic equipment with the vibration function of the present invention has the advantages that the vibration unit is elastically suspended in the receiving space of the housing through the elastic member, so that the vibration unit is formed into a vibration structure independent of the carrier. In this way, in both cases where the surface of the carrier is the flexible material and where the carrier is relatively heavy, the electronic equipment can provide local vibration through the independent vibration unit, so as to directly feedback the vibration actually generated by the vibration unit to the user, that is, directly provide a vibration sense to the user, to improve the experience of the user. At the same time, by the assembling of the elastic member, the electronic equipment can also adjust the fixed frequency of the system through the elasticity of the elastic member, so as to facilitate the generation and fitting of a vibration signal.

BRIEF DESCRIPTION OF THE DRAWINGS

In order to describe the technical solutions in the embodiments of the present invention more clearly, accompanying drawings required to be configured in the descriptions of the embodiments will be briefly introduced below. Obviously, the drawings in the illustration below are merely some embodiments of the present invention. Those ordinarily skilled in the art also can acquire other drawings according to the provided drawings without doing creative work.

Figure 1:
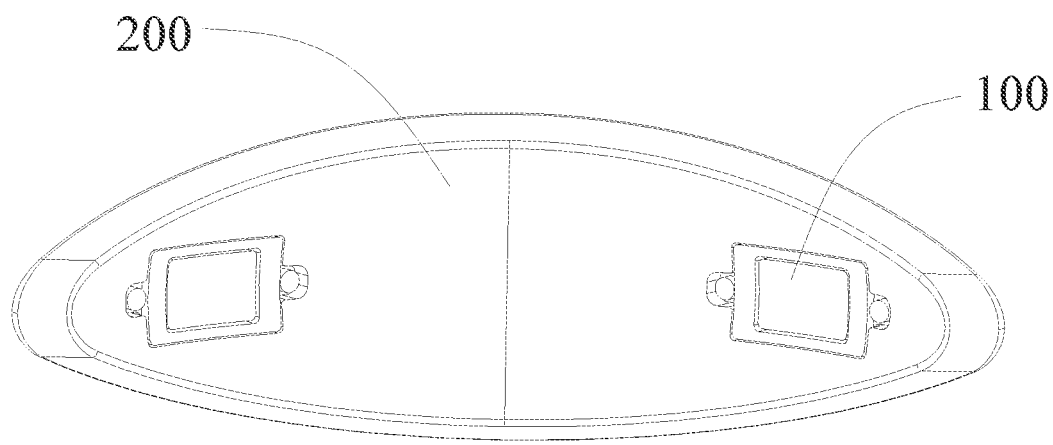
FIG. 1 is an isometric view of electronic equipment with a vibration function provided in an embodiment of the present invention.
Figure 2:
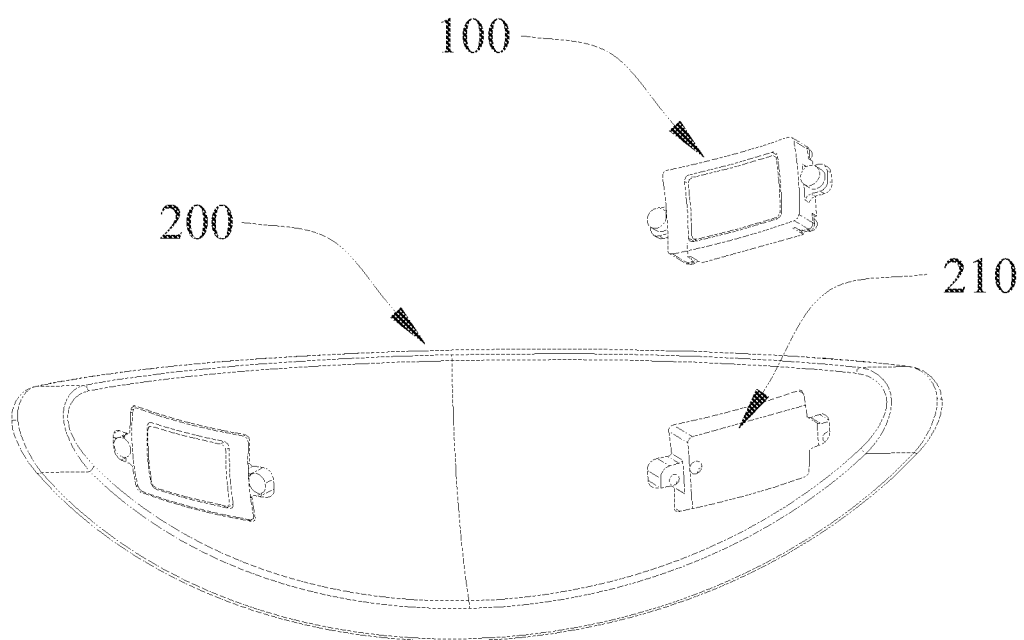
FIG. 2 is an exploded view of electronic equipment with a vibration function provided in an embodiment of the present invention.
Figure 3:
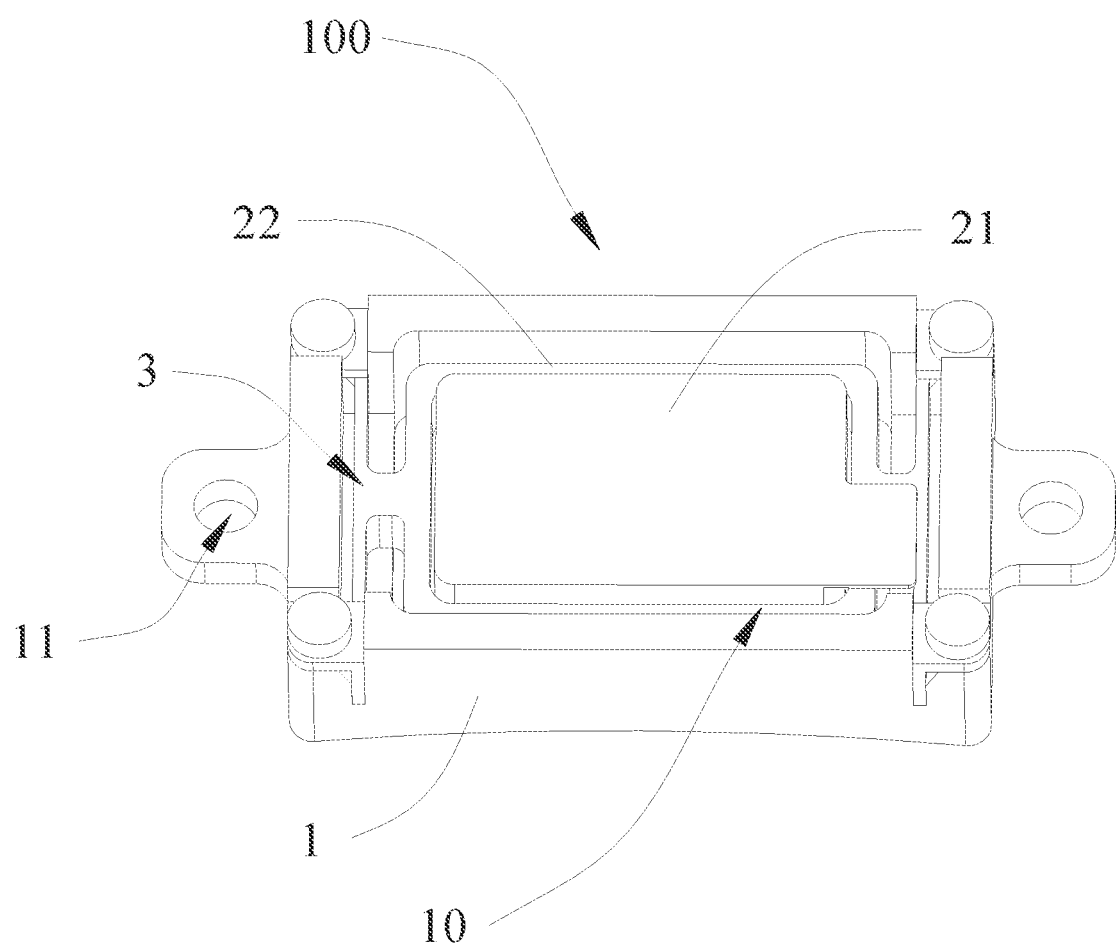
FIG. 3 is an isometric view of a first kind of vibration module provided in an embodiment of the present invention.
Figure 4:
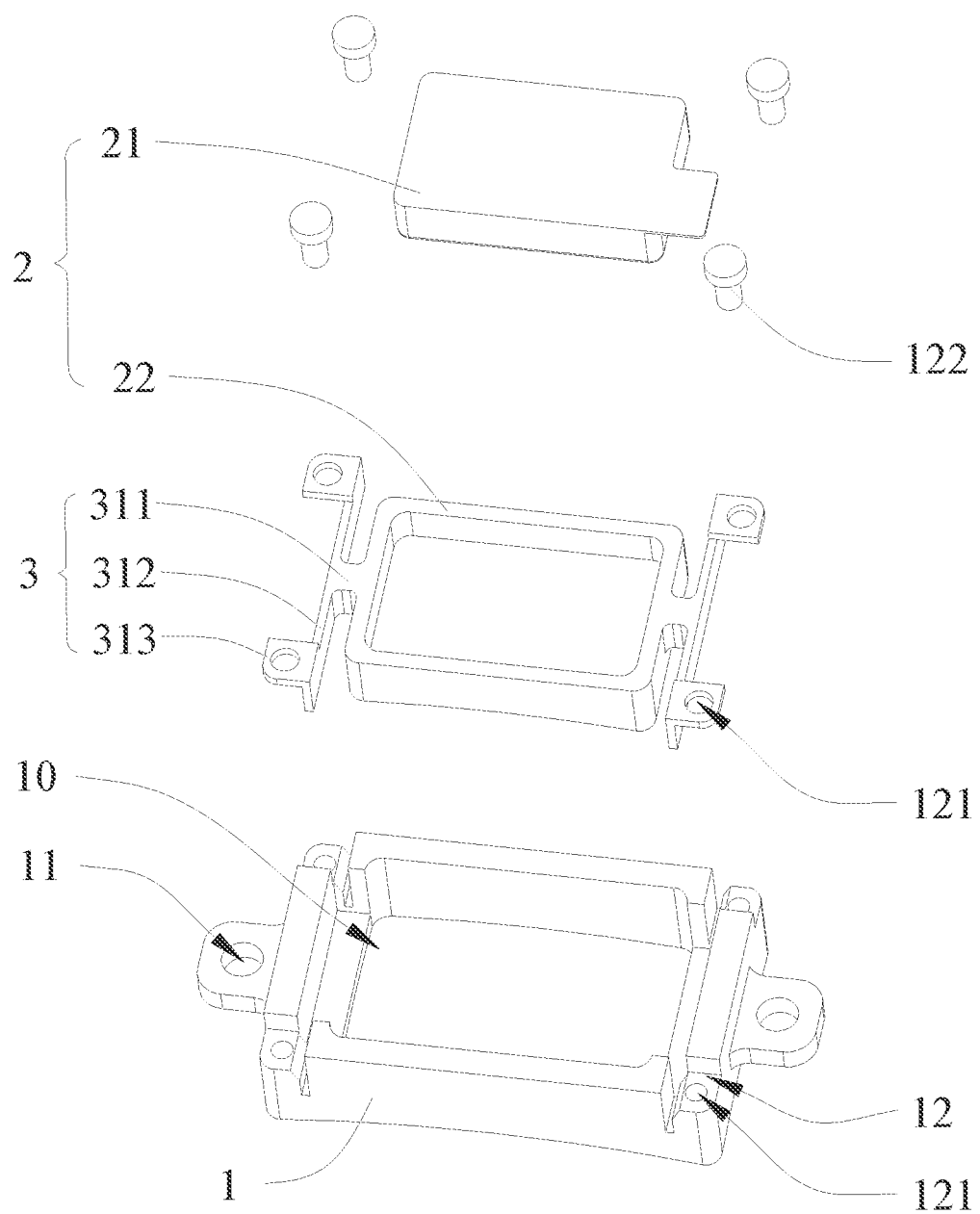
FIG. 4 is an exploded view of a first kind of vibration module provided in an embodiment of the present invention.

100: vibration module; 1: housing; 10: receiving space; 11: mounting hole; 12: sunken slot; 121: connection hole; 122: connector; 13: base; 131: suspension slot; 132: first protrusion; 133: fixing hole; 134: fixing member; 14: cylinder; 141: guide slot; 142: second protrusion; 2: vibration unit; 21: vibration motor; 22: vibration block; 221: limiting portion; 3: elastic member; 311: first connection portion; 312: extension portion; 313: second connection portion; 321: supporting portion; 322: ringlike portion; 3221: third protrusion; 323: elastic arm; 200: carrier; 210: mounting slot.

DETAILED DESCRIPTION OF THE EMBODIMENTS

The technical solutions in the embodiments of the present invention will be described clearly and completely below with reference to the drawings in the embodiments of the present invention. Obviously, the embodiments described herein are only part of the embodiments of the present invention, not all the embodiments. Based on the embodiments in the present invention, all other embodiments obtained by those of ordinary skill in the art without creative work shall fall within the protection scope of the present invention.

The present invention provides electronic equipment with a vibration function. With reference to FIG. 1-8, the electronic equipment includes a carrier 200 and a vibration module 100 configured for providing a vibration sense; the vibration module 100 includes a housing 1 having a receiving space 10 and provided with an opening in at least one end; a vibration unit 2 received in the receiving space 10 and directly providing a vibration sense to a user; and an elastic member 3. The housing 1 is mounted on the carrier 200; and the elastic member 3 elastically connects the vibration unit 2 to the housing 1, so as to elastically suspend the vibration unit 2 in the receiving space 10.

The electronic equipment with a vibration function is referred to as electronic equipment below, which can be a mobile phone, a VR head band, an automobile seat, a VR helmet, a VR vest, and the like. The carrier 200 is a main body of the electronic equipment except the vibration module 100, and the vibration module 100 is mounted at a portion, needing to generate vibration, on the carrier 200.

The housing 1 can be provided with an opening in one end or can be provided with openings in both ends. However, when the housing 1 is mounted on the carrier 200, the housing has at least one opening away from the carrier 200, so as to expose the vibration unit 2, thus directly providing vibration to a user. At the same time, one side of the vibration unit 2 away from the carrier 200 has an opening that partially exposes the housing 1 or is located on the same horizontal plane as the opening of the housing 1, so as to provide the vibration sense to the user.

The housing 1 can be mounted on the carrier 200 in a manner of adhesion, welding, and the like.

Specifically, an outer peripheral side of the housing 1 protrudes to form at least two mounting holes 11 that are spaced apart from each other. When the housing 1 needs to be mounted on the carrier, it can be mounted on the carrier by means of threading screws through the mounting holes 11 so as to achieve fast assembling and disassembling.

The elastic member 3 may be a clip or elastic silica gel or an elastic component.

Specifically, the vibration unit 2 is a vibration motor 21 to provide a vibration effect for the electronic equipment.

Much further, the vibration unit 2 further includes a vibration block 22 wrapped on an outer periphery of the vibration motor 21; and the elastic member 3 is connected to the vibration block 22 to elastically connect the vibration unit 2 to the housing 1. In this way, direct contact between the vibration motor and a vibration portion of the equipment can be avoided. At this time, the vibration unit 2 directly provides the vibration sense to the user through the vibration block 22.

Much further, the carrier 200 is provided with a mounting slot 210 formed by inwardly sinking from one side of the carrier; the housing 1 is mounted in the mounting slot 210; and one side of the vibration module 100 away from the mounting slot 210 and the side of the carrier 200 provided with the mounting slot 210 are located on the same horizontal plane. In this way, when the vibration motor 100 is mounted on the carrier 200 through the housing 1, the flatness of a side surface of the carrier 200 can be maintained, so that it is convenient for the user to use, and the experience is improved.

Specifically, the sides of the housing 1 and the vibration unit 2 of the vibration module 100 away from the mounting slot 210 and the side of the carrier 200 provided with the mounting slot 210 are located on the same horizontal plane.

Compared with the related art, the electronic equipment with the vibration function of the present invention has the advantages that the vibration unit 2 is elastically suspended in the receiving space 10 of the housing 1 through the elastic member 3, so that the vibration unit 2 is formed into a vibration structure independent of the carrier 200. In this way, in both cases where a surface of the carrier 200 is a flexible material and where the carrier 200 is relatively heavy, the electronic equipment can provide local vibration through the independent vibration unit 2, so as to directly feedback vibration actually generated by the vibration unit 2 to the user, that is, directly provide a vibration sense to the user, to improve the experience of the user. At the same time, by the assembling of the elastic member 3, the electronic equipment can also adjust the fixed frequency of the system through the elasticity of the elastic member 3, so as to facilitate the generation and fitting of a vibration signal.

In order to better embody different manners of the present invention, the present invention is explained below through two specific embodiments:

Embodiment I

Electronic equipment with a vibration function in this embodiment, with reference to FIG. 1-4, includes a carrier 200 and a vibration module 100 configured for providing a vibration sense; the vibration module 100 includes a housing 1 having a receiving space 10 and provided with an opening in at least one end; a vibration unit 2 received in the receiving space 10; and an elastic member 3. The housing 1 is mounted on the carrier 200; and the elastic member 3 elastically connects the vibration unit 2 to the housing 1, so as to elastically suspend the vibration unit 2 in the receiving space 10.

In this embodiment, the electronic equipment is a VR head band. Correspondingly, the carrier 200 is a main body of the VR head band.

In this embodiment, the vibration unit 2 includes a vibration motor 21, and a vibration block 22 wrapped on an outer periphery of the vibration motor 21.

In this embodiment, the housing 1 and the vibration block 22 are both of rectangular structures. The receiving space 10 of the housing 1 is formed by penetrating through the housing 1 from one surface to the other surface, that is, two ends are provided with openings.

In this embodiment, protruding blocks which are formed by outward protrusion are arranged in middle regions of two opposite sides of the housing 1. Each protruding block is provided with one mounting hole 11. The housing 1 is mounted at a specified position of the carrier 200 by means of threading screws through the mounting holes.

In this embodiment, two elastic members 3 are included, which are respectively arranged on two opposite sides of the vibration block 22 along a direction perpendicular to a vibration direction of the vibration unit 2.

Each elastic member 3 includes a first connection portion 311, one end of which is connected to the vibration block 22; two extension portions 312 formed by outwardly extending from two opposite sides of one end of the first connection portion 311 away from the vibration block 22; and second connection portions 313 formed by extending, in a bent manner, from ends of the two extension portions 312 away from the first connection portion 311 towards a direction close to the housing 1; and the elastic member 3 is a clip.

A slot body is arranged at a position of the vibration block 22 corresponding to the first connection portion 311, and the first connection portion 311 is snapped and fixed in the slot body. Slot bodies are also arranged at positions of the housing 1 corresponding to ends of the extension portions 312 away from the first connection portion 311, and the ends of the extension portions 312 away from the first connection portion 311 are snapped and fixed in the slot bodies.

In this embodiment, the second connection portions 313 and the housing 1 are detachably connected. In this way, the elastic member 3 and the housing 1 can be convenient to assemble and disassemble.

In this embodiment, sunken slots 12 formed by inward sinking are formed in positions of the housing 1 corresponding to the second connection portions 313; and the second connection portions 313 extend into the sunken slots 12 and are detachably connected with slot bottoms of the sunken slots 12. In this way, on the premise of realizing the connection between the second connection portions 313 and the housing 1, a height that the elastic member 3 needs to occupy is reduced as much as possible.

In this embodiment, the second connection portions 313 and the slot bottoms of the sunken slots 12 are provided with matching connection holes 121. The second connection portions 313 and the slot bottoms of the sunken slots 12 are detachably connected by means of threading connectors 122 through the corresponding connection holes 121. That is, one connector 122 is threaded through the matching connection hole 121 on one second connection portion 313 and the connection hole 121 in the slot bottom of one sunken slot 12, so as to realize the detachable connection.

The connection holes 121 may be threaded holes, and correspondingly, the connectors 122 are screws or bolts.

Before use, the electronic equipment with the vibration function in this embodiment is mounted on the carrier through the mounting holes 11 in the two opposite sides of the housing 1. During use, the vibration motor 21 drives the vibration block 22 to vibrate, and achieves movement and restoration through the elastic member 3, so that the vibration of the vibration block 22 is not affected by the carrier. Thus, a local vibration effect is achieved, and the vibration actually generated by the vibration unit 2 is directly fed back to a user, namely, a vibration sense is directly provided for the user.

Embodiment II

Figure 5:
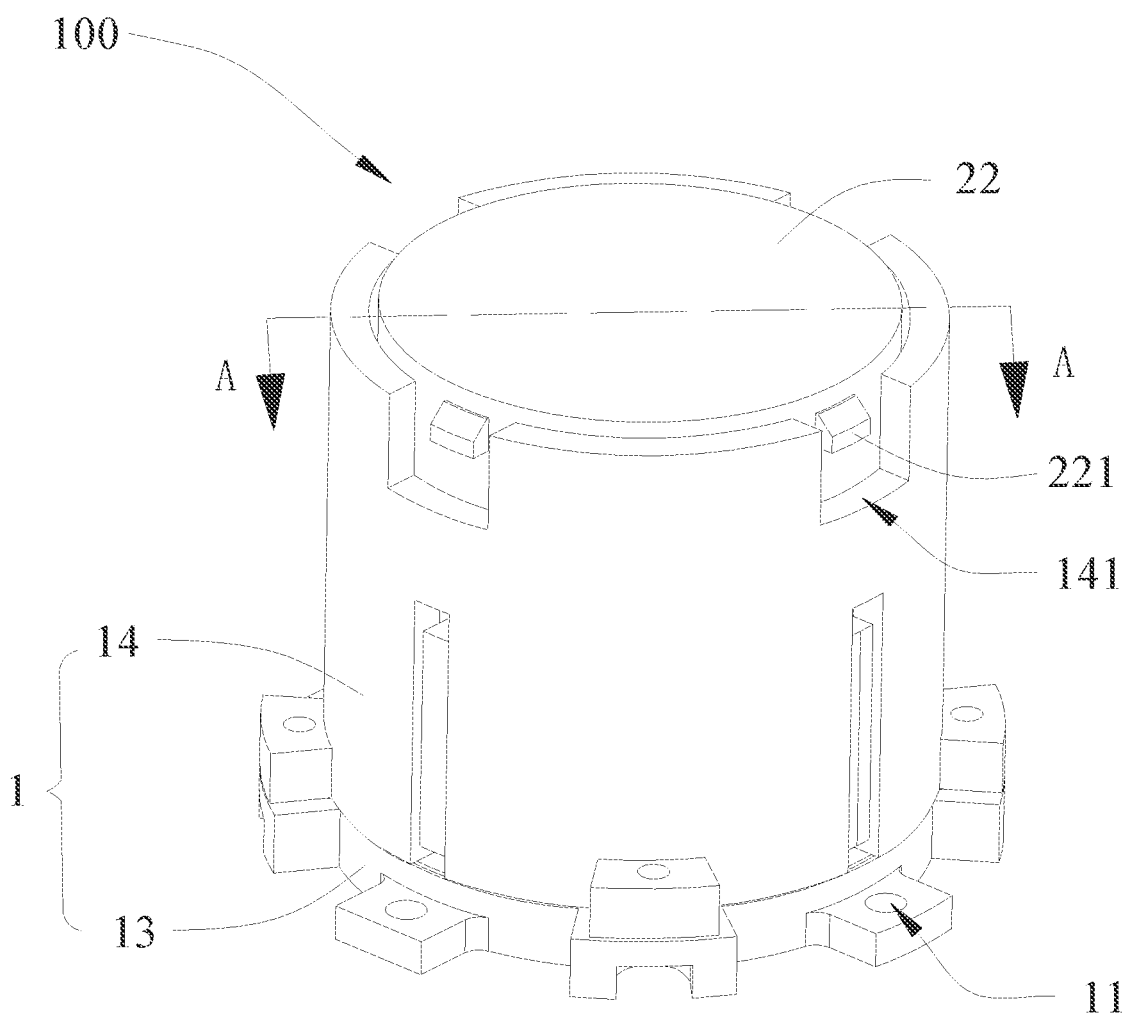
FIG. 5 is an isometric view of a second kind of vibration module provided in an embodiment of the present invention.
Figure 6:
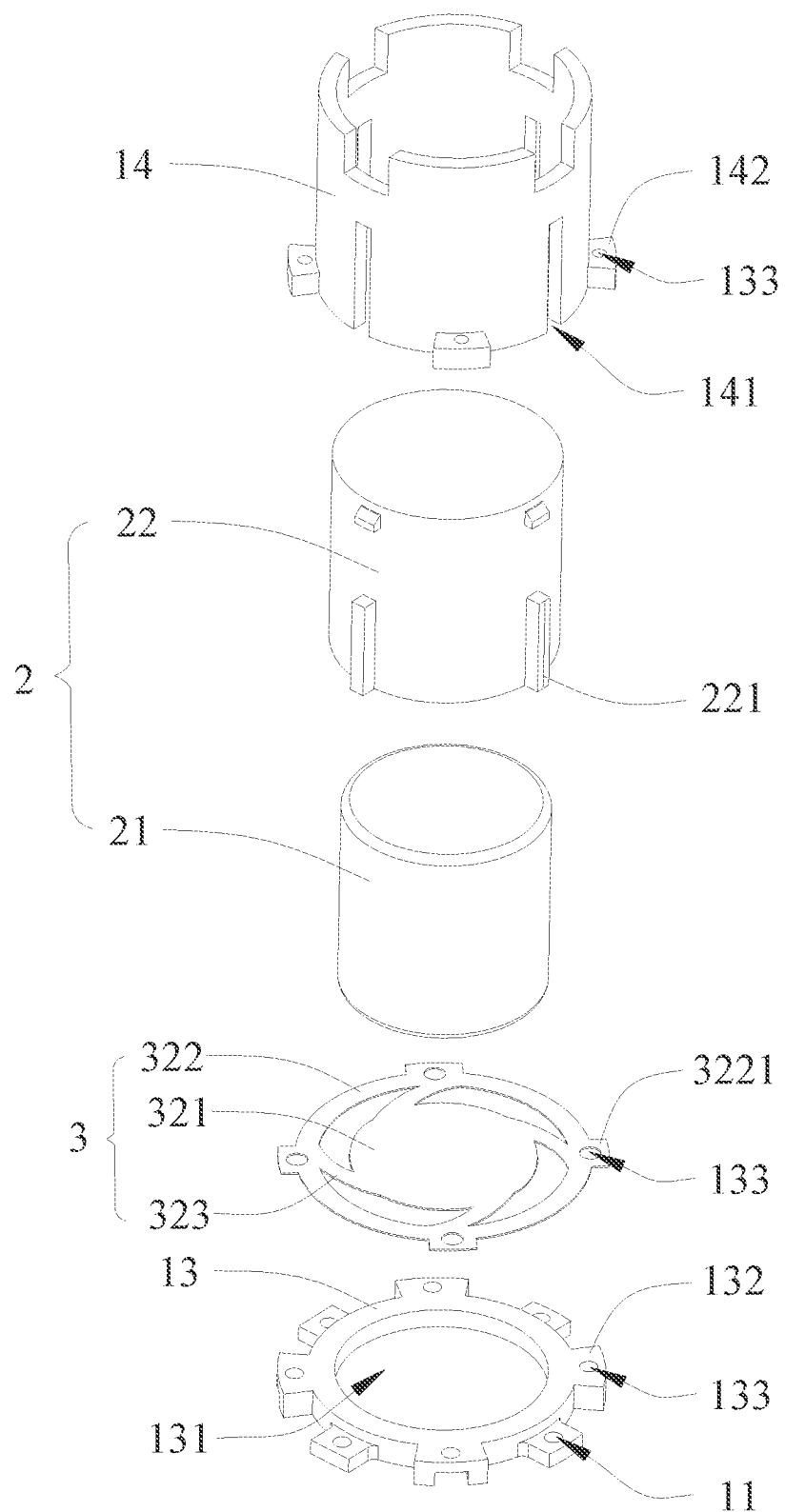
FIG. 6 is an exploded view of a second kind of vibration module provided in an embodiment of the present invention.
Figure 7:
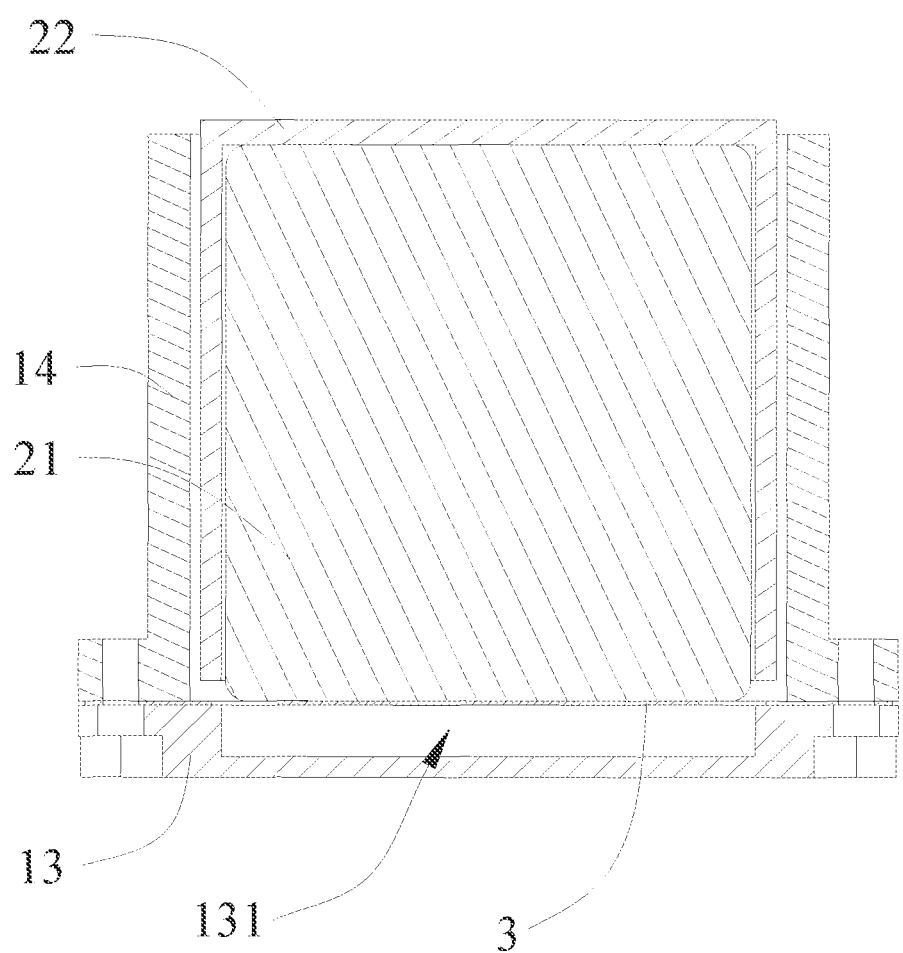
FIG. 7 is a cross-sectional view of FIG. 5 along line A-A.
Figure 8:
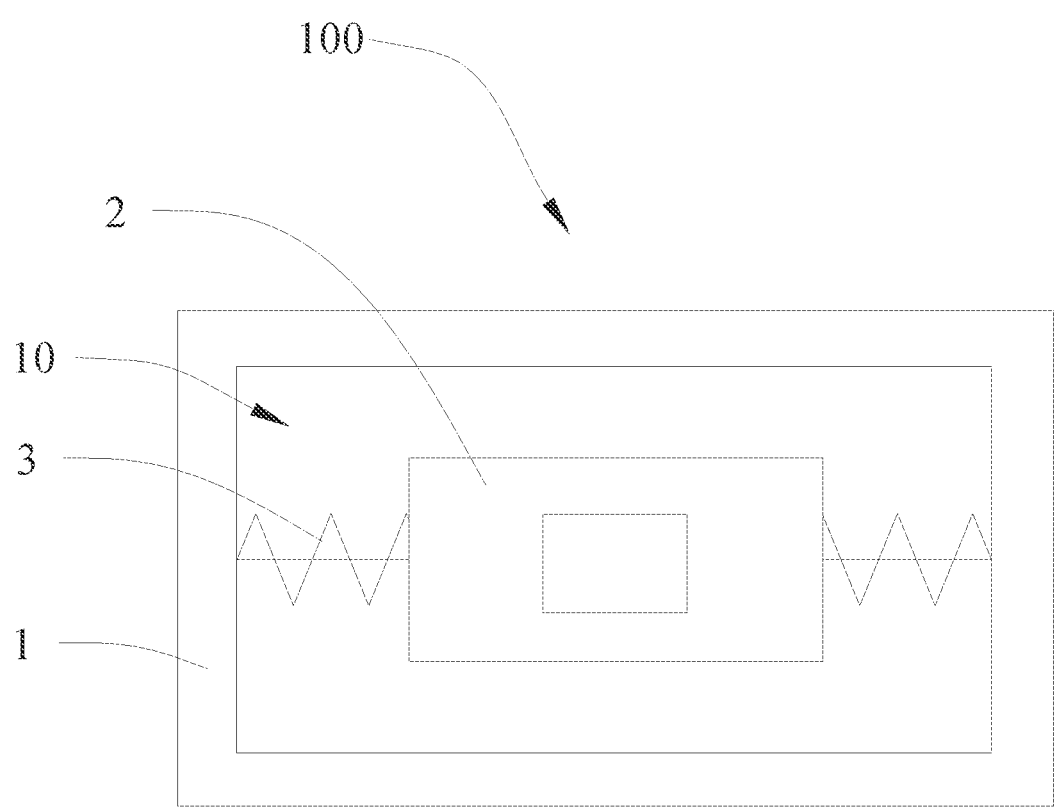
FIG. 8 is a schematic structural diagram of a third kind of vibration module provided in an embodiment of the present invention.

Electronic equipment with a vibration function in this embodiment includes a carrier 200 and a vibration module 100 configured for providing a vibration sense. As shown in FIG. 5-7, the vibration module 100 includes a housing 1 having a receiving space 10 and provided with an opening in at least one end; a vibration unit 2 received in the receiving space 10; and an elastic member 3. The housing 1 is mounted on the carrier 200; and the elastic member 3 elastically connects the vibration unit 2 to the housing 1, so as to elastically suspend the vibration unit 2 in the receiving space 10.

In this embodiment, the electronic equipment is an automobile seat. Correspondingly, the carrier 200 is a main body of the automobile seat.

In this embodiment, the vibration unit 2 includes a vibration motor 21, and a vibration block 22 wrapped on an outer periphery of the vibration motor 21.

In this embodiment, the housing 1 includes a base 13 having a suspension slot 131, and a cylinder 14 detachably connected with a periphery of the base 13. The cylinder 14 is of a hollow structure provided with openings in two ends; and the suspension slot 131 and the hollow portion of the cylinder 14 jointly form the receiving space 10.

The suspension slot 131 is formed by inward sinking from one side of the base 13 close to the cylinder 14.

In this embodiment, four protruding blocks which are formed by outward protrusion are uniformly arranged at the periphery of the base 13. Each protruding block is provided with one mounting hole 11. The housing 1 can be mounted at a specified position of the carrier 200 by means of threading screws through the mounting holes 11 in the base 13.

In this embodiment, circumferential walls of two ends of the cylinder 14 are provided, at intervals along the vibration direction of the vibration unit 2, with a plurality of guide slots 141 that is spaced apart from one another; and limiting portions 221 which extend into the guide slots 141 are arranged at positions of the vibration block 22 corresponding to the guide slots 141. In this way, the guide slots 141 and the limiting portions 221 cooperate with each other to limit the vibration direction of the vibration motor 21.

In this embodiment, one side of the vibration block 22 close to the base 13 is opened, so as to expose the vibration motor 21.

In this embodiment, the elastic member 3 is arranged on one side of the vibration unit 2 close to the base 13. the elastic member 3 includes a supporting portion 321 connected to the vibration motor 21, a ringlike portion 322 which surrounds the supporting portion 321 and is spaced apart from the supporting portion 321, and an elastic arm 323 for elastically connecting the supporting portion 321 to the ringlike portion 322; and the ringlike portion 322 is detachably connected to the base 13. The elastic member 3 is a clip.

The supporting portion 321 and the elastic arm are partially suspended in the suspension slot 131, and the ringlike portion 322 may be connected to the base 13 in a manner of adhesion.

In this embodiment, there are four elastic arms 323 for uniformly connecting corresponding positions of the supporting portion 321 and the ringlike portion 322.

In this embodiment, a plurality of first protrusions 132 which is formed by outward protrusion are arranged on a periphery of the base 13 at intervals. Second protrusions 142 which are formed by outward protrusion are arranged at positions of the cylinder 14 corresponding to the first protrusions 132. Third protrusions 3221 which are formed by outward protrusion are arranged at positions of the ringlike portion 322 corresponding to the first protrusions 132. The corresponding first protrusions 132, second protrusions 142 and third protrusions 3221 are provided with matching fixing holes 133 are formed in positions. The corresponding first protrusions 132, second protrusions 142 and third protrusions 3221 are detachably connected by means of threading fixing members 134 through the corresponding fixing holes 133.

There are four first protrusions uniformly arranged at the periphery of the base 13. Correspondingly, there are also four second protrusions 142 and four third protrusions.

One fixing member 134 is threaded through the corresponding fixing holes 133 in one first protrusion 132, one second protrusion 142 and one third protrusions 3221, thus achieving the detachable connection of the base 13, the cylinder 14 and the ringlike portion 322. If the fixing member 134 is a screw, the fixing hole 133 is a threaded hole.

Before use, the electronic equipment with the vibration function in this embodiment is mounted on the carrier through the mounting holes 11 in the periphery of the housing 1. During use, the vibration motor 21 drives the vibration block 22 to vibrate, and achieves movement and restoration through the elastic member 3. The guide slots 141 and the limiting portions 221 cooperate with each other to limit the vibration direction of the vibration block 22, so that the vibration of the vibration block 22 is not affected by the carrier. Thus, a local vibration effect is achieved, and the vibration actually generated by the vibration unit 2 is directly fed back to a user, namely, a vibration sense is directly provided for the user.

The implementation modes of the present invention are described above only. It should be noted that those of ordinary skill in the art can further make improvements without departing from the concept of the present invention. These improvements shall all fall within the protection scope of the present invention.

What is claimed is:

1. An electronic equipment with a vibration function, comprising:
   a carrier; and
   a vibration module configured for providing a vibration sense, wherein the vibration module comprises:
   a housing having a receiving space and provided with an opening in at least one end;
   a vibration unit received in the receiving space and directly providing a vibration sense to a user, comprising a vibration motor, and a vibration block wrapped on an outer periphery of the vibration motor; and
   two elastic members connected to the vibration block for elastically connecting the vibration unit to the housing, arranged on two opposite sides of the vibration unit along a direction perpendicular to a vibration direction of the vibration unit;
   the housing is mounted on the carrier; and the elastic member elastically connects the vibration unit to the housing, so as to elastically suspend the vibration unit in the receiving space;
   each elastic member comprises a first connection portion, one end of which is connected to the vibration block; two extension portions formed by outwardly extending from two opposite sides of one end of the first connection portion away from the vibration block; and second connection portions formed by extending, in a bent manner, from ends of the two extension portions away from the first connection portion towards a direction close to the housing; and the second connection portions and the housing are detachably connected;
   sunken slots formed by inward sinking are formed in positions of the housing corresponding to the second connection portions; and the second connection portions extend into the sunken slots and are detachably connected with slot bottoms of the sunken slots.

2. The electronic equipment of claim 1, wherein the elastic member is a clip or elastic silica gel.

3. The electronic equipment of claim 1, wherein an outer peripheral side of the housing protrudes to form at least two mounting holes that are spaced apart from each other.

4. The electronic equipment of claim 1, wherein the housing comprises a base having a suspension slot, and a cylinder detachably connected with a periphery of the base; the cylinder is of a hollow structure provided with openings in two ends; the suspension slot and the hollow portion of the cylinder jointly form the receiving space; the vibration unit is received in the receiving space; the elastic member is arranged on one side of the vibration unit close to the base; the elastic member comprises a supporting portion connected to the vibration unit, a ringlike portion which surrounds the supporting portion and is spaced apart from the supporting portion, and an elastic arm for connecting the supporting portion to the ringlike portion; and the ringlike portion is detachably connected to the base.

5. The electronic equipment of claim 4, wherein circumferential walls of two ends of the cylinder are provided, along the vibration direction of the vibration unit, with a plurality of guide slots that is spaced apart from one another; and limiting portions which extend into the guide slots are arranged at positions of the vibration unit corresponding to the guide slots.

6. The electronic equipment of claim 1, wherein the carrier is provided with a mounting slot formed by inwardly sinking from one side of the carrier; the housing is mounted in the mounting slot; and one side of the vibration module away from the mounting slot and the side of the carrier provided with the mounting slot are located on the same horizontal plane.

* * * * *